(12) United States Patent
Stiesdal

(10) Patent No.: US 8,669,672 B2
(45) Date of Patent: Mar. 11, 2014

(54) WIND TURBINE

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 475 days.

(21) Appl. No.: 13/002,836

(22) PCT Filed: Jul. 2, 2009

(86) PCT No.: PCT/EP2009/058296
§ 371 (c)(1),
(2), (4) Date: Jan. 6, 2011

(87) PCT Pub. No.: WO2010/003868
PCT Pub. Date: Jan. 14, 2010

(65) Prior Publication Data
US 2011/0109099 A1    May 12, 2011

(30) Foreign Application Priority Data

Jul. 7, 2008    (EP) ..................................... 08012252

(51) Int. Cl.
*F03D 9/00*    (2006.01)
*H02P 9/04*    (2006.01)

(52) U.S. Cl.
USPC .............................................. 290/55; 290/44

(58) Field of Classification Search
USPC ...................................... 290/44, 55
See application file for complete search history.

(56) References Cited

U.S. PATENT DOCUMENTS

| 4,291,235 | A | 9/1981 | Bergey, Jr. et al. | 290/55 |
| 6,483,199 | B2 | 11/2002 | Umemoto et al. | 290/55 |
| 6,781,276 | B1 | 8/2004 | Stiesdal et al. | 310/254.1 |
| 7,119,453 | B2 | 10/2006 | Bywaters et al. | 290/55 |
| 7,180,204 | B2 | 2/2007 | Grant et al. | 290/55 |
| 7,956,484 | B2 * | 6/2011 | Stiesdal | 290/55 |
| 8,004,107 | B2 * | 8/2011 | Stiesdal | 290/55 |
| 8,210,507 | B2 * | 7/2012 | Mitsch | 267/141.1 |
| 8,358,028 | B2 * | 1/2013 | Stiesdal | 290/55 |
| 2006/0027686 | A1 | 2/2006 | Taylor et al. | 241/2 |
| 2006/0152014 | A1 | 7/2006 | Grant et al. | 290/55 |
| 2008/0308980 | A1 * | 12/2008 | Mitsch | 267/141.1 |
| 2009/0015020 | A1 * | 1/2009 | Stiesdal | 290/55 |
| 2010/0045047 | A1 * | 2/2010 | Stiesdal | 290/55 |
| 2011/0062719 | A1 * | 3/2011 | Stiesdal | 290/55 |
| 2011/0109099 | A1 * | 5/2011 | Stiesdal | 290/55 |
| 2011/0115234 | A1 * | 5/2011 | Stiesdal | 290/55 |
| 2011/0229312 | A1 * | 9/2011 | Frank | 415/170.1 |
| 2012/0076652 | A1 * | 3/2012 | Ventzke et al. | 416/1 |
| 2013/0243598 | A1 * | 9/2013 | Ziegler et al. | 416/147 |

FOREIGN PATENT DOCUMENTS

| DE | 201 16 649 U1 | 1/2002 |
| DE | 102 55 745 A1 | 6/2004 |
| EP | 1 394 406 A2 | 3/2004 |

(Continued)

*Primary Examiner* — Pedro J Cuevas

(57) ABSTRACT

A wind turbine which includes a direct drive generator is disclosed. The direct drive generator includes an inner stator arrangement and an outer rotor arrangement and a stationary shaft with a center axis. The stator arrangement is arranged on the outside of the stationary shaft, the rotor arrangement is substantially arranged around the stator arrangement, on the front side at least indirectly supported or arranged on the stationary shaft by a main bearing and on the rear side at least indirectly supported or arranged on the stationary shaft by a support bearing. The main bearing and/or the support bearing is a four-point bearing.

13 Claims, 1 Drawing Sheet

(56) References Cited

FOREIGN PATENT DOCUMENTS

| EP | 1 641 102 A1 | 3/2006 | |
| EP | 2143944 A1 * | 1/2010 | ............ F03D 11/00 |
| FR | 2 810 374 A1 | 12/2001 | |
| WO | WO 02/05408 A1 | 1/2002 | |
| WO | WO 02/057624 A1 | 7/2002 | |
| WO | WO 03/023943 A2 | 3/2003 | |

* cited by examiner

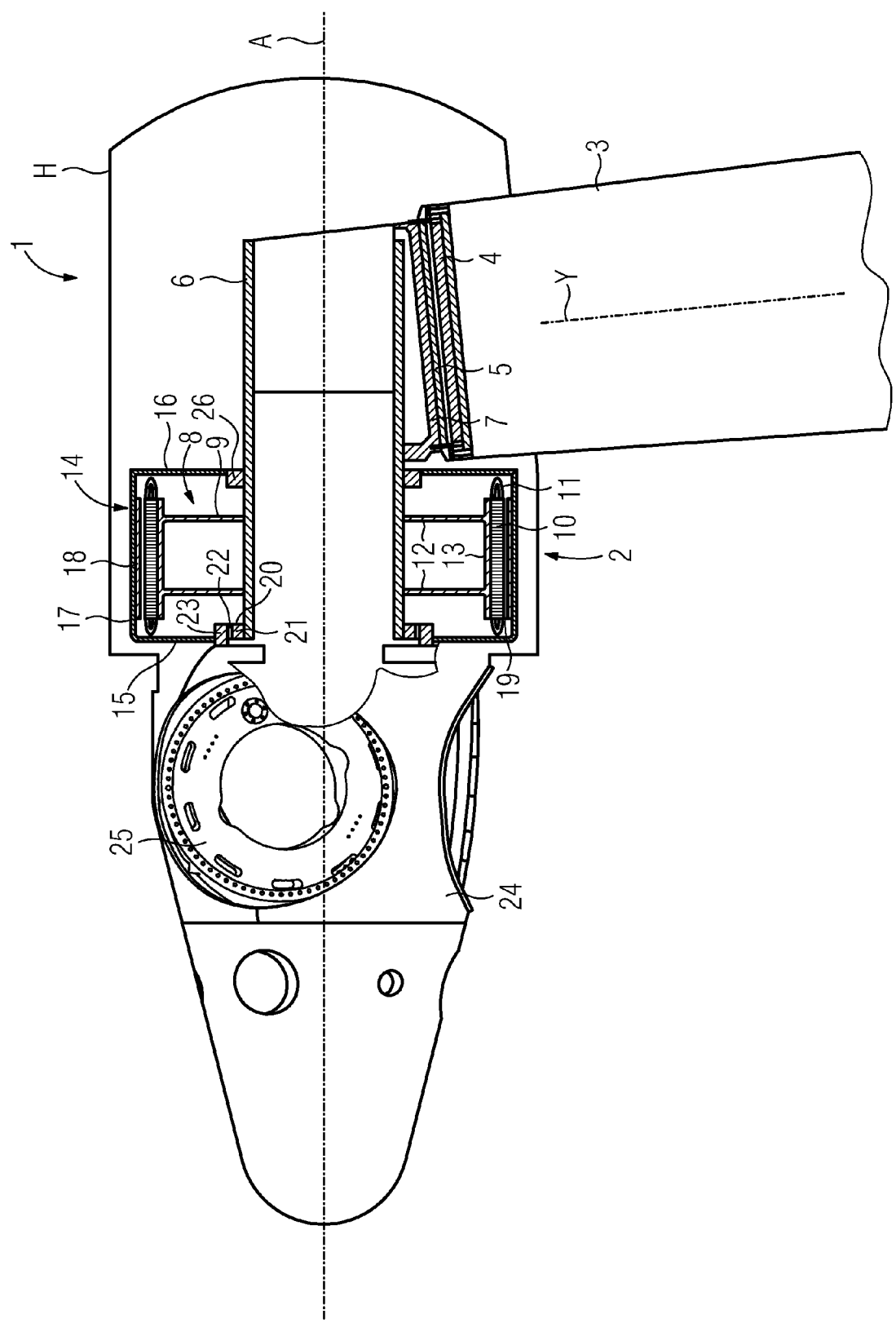

WIND TURBINE

CROSS REFERENCE TO RELATED APPLICATIONS

This application is the US National Stage of International Application No. PCT/EP2009/058296, filed Jul. 2, 2009 and claims the benefit thereof. The International Application claims the benefits of European application No. 08012252.6 EP filed Jul. 7, 2008. All of the applications are incorporated by reference herein in their entirety.

FIELD OF INVENTION

The invention relates to a wind turbine comprising a direct drive generator.

BACKGROUND OF INVENTION

In principle there are two main types of wind turbines in view of the drive configuration of a wind turbine. The first type of a wind turbine is the more classical type of a wind turbine comprising a gearbox arranged between the main shaft and a generator of the wind turbine. The second type of a wind turbine is a gearless type comprising a direct drive or a directly driven generator. Such a direct drive generator can be made as a synchronous generator with winded rotor or with permanent magnets attached to the rotor, or it can be designed as an alternative type of a generator. Independently from the type of a direct drive generator it is desirable that the width of the air gap between the rotor and the stator of the generator is preferably maintained constantly or at least within certain tolerances during the operation of the wind turbine and the direct drive generator respectively even when the arrangement of wind turbine rotor, main shaft and direct drive generator is subject to loads.

SUMMARY OF INVENTION

Therefore different bearing arrangements for a drive configuration of a wind turbine comprising a direct drive generator were developed. Up to now the classical bearing arrangement of a direct drive generator is a two-bearing arrangement. Thereby the rotor of the generator which is connected to the wind turbine rotor is supported with two bearings towards a stationary inner shaft or a fixed inner shaft. The stator is on one side attached to the stationary inner shaft. Thus the rotor can turn relatively to the stator around the stationary inner shaft. Wind turbines with such a design are e.g. described in EP 1 641 102 A1 and U.S. Pat. No. 6,483,199 B2. The drawback of such a design is that the one-side support of the stator makes it difficult to maintain the width of the air gap at least substantially constant at the unsupported side of the stator in particular when the entire generator structure is not only subject to gravity and mass inertia but also to unbalanced magnetic pull. In order to reduce this drawback a direct drive generator with such a two-bearing arrangement needs a large and heavy stator support structure capable of absorbing relatively large bending moments of the stator. Such a stator support structure is e.g. described in WO 02/05408 A1 wherein the stator support structure comprises a support construction having a plenty of support arms.

In an alternative design the two-bearing arrangement is replaced with a single bearing with a stationary inner bearing part attached to a stationary inner shaft and a rotating outer bearing part supporting the rotor of the direct drive generator. Wind turbines comprising a direct drive generator with a single bearing are disclosed in US 2006/0152014 A1 and WO 02/057624 A1. But the replacement of the two bearings with a single bearing does not substantially change the drawback of the unilaterally supported stator structure.

In some further solutions the stationary inner shaft concept is replaced with a rotating shaft concept. Since the stator of the generator is supported on both sides according to the rotating shaft concept, it is easier to maintain the width of the air gap between the rotor and the stator of the generator at least substantially constantly. There are two known variants of the rotating shaft concept, one with a two-bearing arrangement and one with a four-bearing arrangement.

According to the two-bearing arrangement the bearings of the generator act as bearings of a main shaft for the wind turbine which main shaft is connected to the wind turbine rotor. The stator structure is supported towards the main shaft and attached to a bedplate of the wind turbine. Wind turbines having such a design are disclosed in U.S. Pat. No. 7,119,453 B2 and WO 03/023943 A2. A drawback of this design is that the stator structure needs to be dimensioned to absorb and transfer all wind turbine rotor loads, i.e. the weight of the wind turbine rotor and all asymmetric aerodynamic loads to maintain the width of the air gap within the necessary tolerances. On large wind turbines this leads to very heavy and expensive stator structures.

In the four-bearing arrangement the main shaft of the wind turbine which is connected to the wind turbine rotor on its one end is supported by its own two bearings and carries at its other end the direct drive generator. The direct drive generator has a two-bearing arrangement for the centering of the rotor inside the stator. An example of such a wind turbine is described in U.S. Pat. No. 6,781,276 B1. In this main shaft mounted arrangement the generator stator is carried by the generator rotor and torque is transferred from the generator to the wind turbine bedplate through a torque aim arrangement. The torque arm arrangement needs to comprise some kind of flexibility, e.g. implemented with rubber elements, to allow for minor misalignments between the main shaft—generator structure and the turbine bedplate. The bilateral support of the stator on the rotor enables for a relatively lightweight stator structure. The main drawback of this design is that a total of four bearings are required, and that the full torque has at least partially to pass through these bearings. For large wind turbines this means comparatively large and expensive bearings. Furthermore, for large wind turbines the torque arm arrangement becomes a comparatively substantial and heavy structure.

In U.S. Pat. No. 4,291,235 a further bearing arrangement for a wind turbine is described. The wind turbine comprises a stationary shaft as well as a direct drive generator having an inner stator and an outer rotor. The inner stator is arranged on the stationary shaft. The outer rotor is connected to the hub of the wind turbine, on the front side connected to the stationary shaft by a front bearing and on the rear side connected to the stationary shaft by rear bearing. Thereby the bearing arrangement is not optimal in relation to the load capacity.

It is therefore an object of the present invention to provide a wind turbine as initially mentioned with a simplified design and an improved load capacity.

This object is inventively achieved by a wind turbine comprising a direct drive generator having an inner stator arrangement and an outer rotor arrangement and a stationary shaft having a centre axis, wherein the stator arrangement is arranged on the outside of the stationary shaft, the rotor arrangement is substantially arranged around the stator arrangement, on the front side at least indirectly supported or arranged on the stationary shaft by a main bearing and on the rear side at least indirectly supported or arranged on the stationary shaft by a support bearing, wherein the main bearing and/or the support bearing is/are a four-point bearing. According to the present invention both the stator arrangement and the rotor arrangement comprise a two side support with advantages in view of the maintenance of the width of the air gap during operation of the generator and the wind turbine respectively. Therefore in particular the stator arrangement can be designed relatively lightweight in comparison to one side support structures. The rotor arrangement is arranged substantially around the stator arrangement and on the front and the rear side supported by a bearing. The main bearing and/or the support bearing is as already mentioned a four-point bearing. Four-point bearings in particular four-point roller bearings have as a rule on their outer and inner rings two circular arc-shaped raceways whose centres of curvature are offset so that during radial loading the bearing elements contact the raceways at four points. The contact angles of four-point bearings are relatively large. Therefore such a bearing is capable of transmitting high axial loads in both directions of the centre axis of the stationary shaft. In this way a simplified design of a wind turbine with an improved load capacity in particular in relation to the four-point bearing is achieved.

The described bearing arrangement comprising the main four-point bearing and/or the support four-point bearing shows because of the four-point bearing which acts like two bearings the properties of at least a three bearing arrangement. Such a three bearing structure can be sometimes statically undetermined. In this case any misalignments due to mounting tolerances or any deformations arising as a result of gravity or external loads to the stationary shaft or the generator as a whole could lead to an uneven load distribution between the bearings of the wind turbine which in turn could cause a premature bearing failure.

Therefore the rotor arrangement comprises according to an embodiment of the invention a front endplate as part of a rotor support structure which front endplate is at least indirectly supported or arranged on the stationary shaft by the main bearing. Thereby the front endplate can be attached to the hub, in particular when the hub is supported by the main bearing against the stationary shaft. The front endplate is preferably substantially perpendicularly arranged relatively to the centre axis of the stationary shaft and/or at least partially in a certain adequate extent flexible in the directions of the centre axis of the stationary shaft. Thus the potential problem of a static indeterminacy of a three bearing arrangement is in case of this embodiment of the invention eliminated by establishing a sufficient flexibility of the front endplate of the rotor arrangement in the directions of the centre axis of the stationary shaft. According to this the front endplate acts like a membrane supporting the rotor arrangement substantially firmly in the radial direction so as to maintain the air gap, but flexing readily so as to enable e.g. a bending of the stationary shaft with no major resistance.

In a variant of the invention the front endplate is a ring-shaped endplate and in particular substantially flat. Preferably the front endplate is made of steel or fibreglass. According to a further variant of the invention the front endplate has a thickness of approximately 15-50 mm, preferably 20-30 mm. Thus the front endplate has such dimensions e.g. in dependence of the material and/or the structure of the front endplate that the front endplate has a comparatively little bending stiffness. It simply flexes passively when e.g. the stationary shaft is shifted a bit by deflection, while at the same time maintaining the width of the air gap.

According to another embodiment of the invention the rotor arrangement comprises a rear, preferably ring-shaped and in particular flat endplate as part of a rotor support structure which rear endplate is at least indirectly supported or arranged on the stationary shaft by the support bearing. According to a variant of the invention the rear endplate is also made of steel or fibreglass.

According to a further variant of the invention the rotor arrangement comprises a hollow cylinder element as part of a rotor support structure. As a rule this hollow cylinder element connects the front and the rear endplate to each other.

In an embodiment of the invention the rotor arrangement comprises at least one permanent magnet. Typically a plurality of permanent magnets is arranged on the cylindrical inside of the hollow cylinder element.

In a further embodiment of the invention the stator arrangement comprises a stator support structure at least indirectly attached to the stationary shaft and at least one lamination stack with at least one winding arranged on the stator support structure. The lamination stack with windings is oppositely arranged to the permanent magnets of the rotor arrangement with the air gap in-between. Normally the air gap has a substantially constant width of approximately 5 mm.

In a variant of the invention the stationary shaft is at least indirectly arranged on the bedplate of the wind turbine. Preferably the stationary shaft is attached to a retaining arrangement which is arranged on the bedplate.

BRIEF DESCRIPTION OF THE DRAWINGS

The invention will in the following be explained in more detail with reference to the schematic drawing showing a part of an inventive wind turbine.

DETAILED DESCRIPTION OF INVENTION

The FIGURE shows schematically an embodiment of an inventive wind turbine 1 comprising a direct drive generator 2 which is arranged on the upwind side of a tower 3 of the wind turbine 1.

A tower flange 4 is arranged on the top of the tower 3. A bedplate 5 is attached to the tower flange 4. The wind turbine 1 comprises in a not explicitly shown manner a yaw system for turning the bedplate 5 of the wind turbine 1 around the axis Y of the tower 3 together with the other components of the wind turbine 1 which are directly or indirectly attached to the bedplate 5.

The wind turbine 1 comprises a stationary shaft 6 having a centre axis A. The rear side of the stationary shaft 6 is attached to a retaining arrangement 7 which is attached to the bedplate 5. On the front side of the stationary shaft 6 a stator arrangement 8 of the direct drive generator 2 is arranged. The stator arrangement 8 comprises a stator support structure 9 and a lamination stack 10 with windings 11. The stator support structure 9 comprises in case of the present embodiment of the invention two support elements 12 for a two side support of the lamination stack 10. In case of the present embodiment of the invention the support elements 12 are ring-shaped support elements 12 attached, e.g. bolted, to the outside of the stationary shaft 6. The ring-shaped support elements 12 are able to be compact or are able to comprise spokes or a spoke structure. A kind of hollow cylindrical support element 13 is attached to the outer ends of the ring-shaped support elements 12. The hollow cylindrical support element 13 carries the ring-shaped lamination stack 10 with windings 11. The lamination stack 10 is able to comprise ring segment shaped lamination stack segments each having at least one winding 11 which segments build in their entirety the lamination stack 10.

A rotor arrangement 14 is substantially arranged around the stator arrangement 8. In case of the present embodiment of the invention the rotor arrangement 14 comprises a front ring-shaped endplate 15, a rear ring-shaped endplate 16 and a hollow cylinder element 17 connecting the front ring-shaped endplate 15 and the rear ring-shaped endplate 16 to each other. On the inside the hollow cylinder element 17 comprises a plurality of permanent magnets 18 substantially arranged oppositely to the lamination stack 10. An air gap 19 having a width of approximately 5 mm is located between the permanent magnets 18 and the lamination stack 10.

In case of the present embodiment of the invention the front ring-shaped endplate 15 is indirectly arranged on the stationary shaft 6 by a four-point bearing 20 capable of transmitting high axial loads in both directions of the centre axis A. An appropriate four-point bearing is e.g. disclosed in DE 201 16 649 U1. The stationary part 21 of the four-point bearing 20 is attached to the stationary shaft 6. The rotating part 22 of the four-point bearing 20 is in case of the present embodiment of the invention connected to a mounting ring 23. The front endplate 15 as well as the hub 24 of the wind turbine 1 are attached e.g. bolted to the mounting ring 23. By the way the hub 24 comprises three mounting devices 25 for three not shown, but well known wind turbine rotor blades.

The rear ring-shaped endplate 16 is connected to the stationary shaft 6 by means of another four-point bearing 26, a so called support bearing 26. Thus also the rotor arrangement 14 has a two side support. Moreover the rotor arrangement 14 can turn together with the hub 24 relatively to the stator arrangement 8, wherein in particular the permanent magnets 18 turn relatively to the lamination stack 10 for power generation.

For avoiding situations in which the bearing arrangement comprising the two four-point bearings 20 and 26 is statically undetermined the front endplate 15 of the rotor arrangement 14 comprises and adequate flexibility in the directions of the centre axis A. Thereby the front endplate 15 acts like a membrane supporting the rotor arrangement 14 substantially firmly in the radial direction so as to maintain the width of the air gap 19, but flexing readily so as to allow e.g. a bending of the stationary shaft 6 with no major resistance. The front endplate 15 has such dimensions that it has a comparatively little bending stiffness. It simply flexes passively when e.g. the stationary shaft 6 is shifted a bit by deflection. Thus when a bending of the stationary shaft 6 occurs the front endplate 15 bends in the directions of the centre axis A wherein the width of the air gap 19 is maintained substantially constant or within required tolerances.

The front endplate 15 is typically made of steel or fibreglass and has a thickness of approximately 15-55 mm, preferably of 20-30 mm. The rear endplate 16 of the rotor arrangement 14 is also able to be made of steel or fibreglass. Normally the rear endplate 16 has a higher thickness as the front endplate 15.

This bearing arrangement has besides the advantages of a lightweight, relatively simple and less expensive design the additional advantage over existing designs of wind turbines that it provides the preconditions for a well-defined sealing arrangement in particular when the direct drive generator 2 is located on the upwind side of the tower 3. Thereby a substantially total enclosure of the generator 2 is easier to establish which is particularly of importance for an application offshore and in other problematic environments.

By the way the described wind turbines 1 comprise a housing H normally called the nacelle.

Moreover it is not necessary that both bearings, the main bearing 20 and the support bearing 26 are four-point bearings. It is also possible that only the main bearing 20 or only the support bearing 26 is a four-point bearing.

The invention claimed is:

1. A wind turbine comprising:
   a main bearing;
   a support bearing;
   a stationary shaft with a centre axis; and
   a direct drive generator comprising:
      an inner stator arrangement arranged on an outside of the stationary shaft, and
      an outer rotor arrangement substantially arranged around the inner stator arrangement, the outer rotor arrangement at least indirectly supported or arranged on a front side of the stationary shaft by the main bearing and at least indirectly supported or arranged on a rear side the stationary shaft by the support bearing wherein the rotor arrangement includes a front endplate which is at least indirectly supported or arranged on the stationary shaft by the main bearing and the front endplate is at least partially flexible in the direction of the centre axis of the stationary shaft and,
   wherein at least the main bearing or the support bearing is a four-point bearing.

2. The wind turbine according to claim 1, wherein the front endplate is a ring-shaped endplate.

3. The wind turbine according to claim 1 wherein the front endplate is made of steel or fibreglass.

4. The wind turbine according to claim 1 wherein the front endplate has a thickness of approximately 15-50 mm.

5. The wind turbine according to claim 1, wherein the rotor arrangement comprises a rear endplate which is at least indirectly supported or arranged on the stationary shaft by the support bearing.

6. The wind turbine according to claim 5, wherein the rear endplate is a ring-shaped endplate.

7. The wind turbine according to claim 5, wherein the rear endplate is made of steel or fibreglass.

8. The wind turbine according to claim 1, wherein the rotor arrangement comprises a hollow cylinder element.

9. The wind turbine according to claim 1,
   wherein the rotor arrangement comprises a rear endplate which is at least indirectly supported or arranged on the stationary shaft by the support bearing, and
   wherein the rotor arrangement comprises a hollow cylinder element which connects the front endplate to the rear endplate.

10. The wind turbine according to claim 1, wherein the rotor arrangement comprises a permanent magnet.

11. The wind turbine according to claim 1, wherein the stator arrangement comprises a stator support structure and a lamination stack with at a winding arranged on the stator support structure.

12. The wind turbine according to claim 1, wherein the stationary shaft is at least indirectly arranged on a bedplate of the wind turbine.

13. The wind turbine according to claim 12, wherein the stationary shaft is attached to a retaining arrangement which is arranged on the bedplate.

* * * * *